United States Patent [19]

Innes et al.

[11] Patent Number: 4,660,256
[45] Date of Patent: Apr. 28, 1987

[54] POULTRY TRANSFER MACHINE

[75] Inventors: Robert S. Innes; Stefan Pagowski, both of Hamilton, Canada

[73] Assignee: Canadian Bird Equipment Limited, Ontario, Canada

[21] Appl. No.: 617,550

[22] Filed: Jun. 5, 1984

[30] Foreign Application Priority Data

Dec. 19, 1983 [CA] Canada .................................. 443616

[51] Int. Cl.$^4$ ............................................. A22C 21/00
[52] U.S. Cl. ............................................ 17/52; 17/11; 17/24
[58] Field of Search ............................ 17/11, 24, 45, 52

[56] References Cited

U.S. PATENT DOCUMENTS

| | | | |
|---|---|---|---|
| 2,634,737 | 4/1953 | Rowe | 134/128 |
| 3,058,604 | 10/1962 | Harper et al. | 214/89 |
| 3,522,622 | 8/1970 | Crane | 17/11 |
| 3,643,293 | 2/1972 | Rejsa et al. | 17/11 |
| 4,034,440 | 7/1977 | van Mil | 17/24 |
| 4,178,659 | 12/1979 | Simonds | 17/24 |

Primary Examiner—Willie G. Abercrombie
Attorney, Agent, or Firm—Oblon, Fisher, Spivak, McClelland & Maier

[57] ABSTRACT

The invention is a rotary transfer apparatus for transferring poultry carcasses from the shackles on one conveyor line to the shackles on another conveyor line. In particular, the apparatus of the invention can be used for transferring carcasses between a kill line and an evisceration line, a rotary member of the apparatus being positioned between those lines. The transfer apparatus may include a knife mechanism for removing the lower part of the legs of each carcass. The knife mechanism is fixed to the frame of the apparatus at one position on the periphery of the rotary member and acts on the carcasses as they pass that position. The apparatus of the invention is intended in part to replace what is at present in many poultry plants a manual operation.

26 Claims, 17 Drawing Figures

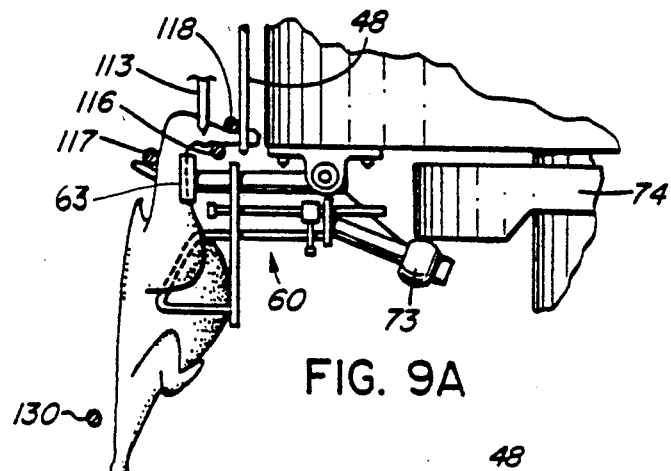
FIG. 9A
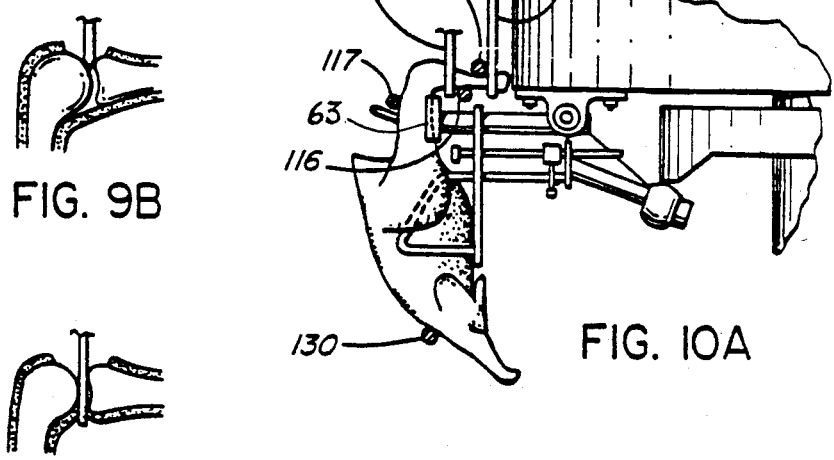
FIG. 9B
FIG. 10A
FIG. 10B
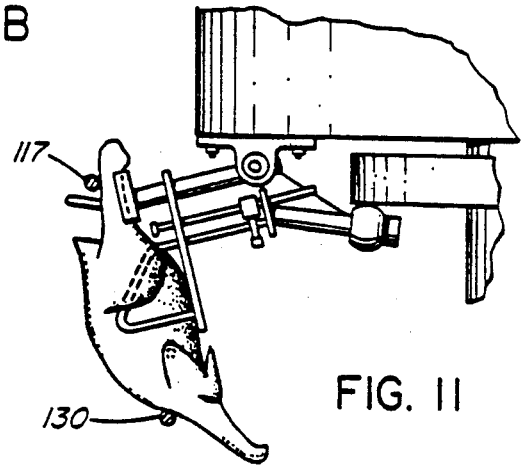
FIG. 11

POULTRY TRANSFER MACHINE

FIELD OF THE INVENTION

This invention relates to a transfer apparatus for transferring items on one conveyor line to a second conveyor line. More particularly, it relates to a rotary transfer apparatus for transferring poultry carcasses from shackles on one conveyor line to shackles on a second conveyor line.

BACKGROUND OF THE INVENTION

A rotary transfer apparatus for transferring poultry from one conveyor line to a second conveyor line is disclosed in U.S. Pat. No. 4,178,659, granted to Michael E. Simonds on Dec. 18, 1979. In that reference, each poultry carcass is maintained on a shackle of the input conveyor line by the capture of the lower part of one of its legs between a pair of parallel spaced rods of the shackle. The rotary member positioned between the two conveyor lines for transferring the poultry carcasses between those lines has a series of equiangularly-spaced stations extending around its circumference, each station having a pair of extending parallel spaced rods of similar configuration to the pair of spaced rods on the shackles of the conveyor lines. The apparatus utilizes guide bars to push a carcass from the pair of spaced rods on a shackle of the first conveyor line onto a respective pair of the spaced rods on the rotary member. After the rotary member has turned approximately 180°, a second guide bar is positioned to push the leg of the carcass from the pair of spaced bars on the rotary member onto the pair of spaced bars of a shackle on the second conveyor line.

One disadvantage of the Simonds construction, which is remedied by the subject invention, is that a carcass hanging by only one leg can freely rotate on the respectively-associated shackles of the conveyor lines and on the rotary member. The carcass must therefore be re-oriented prior to a further operation such as evisceration. Also, the relatively short distance of interaction between each conveyor line and the rotary member in this construction limits its rate of transfer of poultry carcasses.

Although no rotary member is involved, U.S. Pat. No. 4,034,440 granted to M. P. D. van Mil on July 12, 1977 discloses another means for transferring poultry carcasses between conveyor lines. However, the transfer apparatus of this reference would necessarily operate at a slower rate then the previously-described apparatus.

An important feature of the rotary transfer apparatus of the subject invention is a knife mechanism for removing the lower part of the legs (sometimes referred to as "hock") of the carcasses. With respect to that feature, one reference of interest is U.S. Pat. No. 3,643,293 granted to Jack J. Rejsa on Feb. 22, 1972. In that reference, poultry carcasses are transferred from a picking line conveyor to an evisceration line conveyor by an intermediately-positioned transfer conveyor. A hock cutter apparatus is positioned in the region of adjacency between the picking line conveyor and the transfer conveyor. The lower part of the legs of each poultry carcass is cut from the remainder of the carcass prior to the carcass being transferred on the transfer conveyor to the evisceration line conveyor.

U.S. Pat. No. 3,522,622, granted to E. J. Crane on Aug. 4, 1970, discloses a hock cutter apparatus in which the lower part of the leg of each carcass is stretched across a support member prior to that lower leg being separated from the remainder of the carcass by a blade having an initial dull portion and a following sharp portion. The blade has a stationary longitudinal position on the hock cutter apparatus, and the lower part of the legs of the carcass are positioned between the fingers of a drag conveyor. The drag conveyor pulls the hock joints (separating the lower part from the upper part of each leg) against the edge of the blade. The blade is driven with a vibratory motion normal to the joint to facilitate penetration of the blade between the parts of the joint.

GENERAL DISCUSSION OF THE INVENTION

The subject invention is an apparatus which not only transfers poultry carcasses from a first conveyor line to a second conveyor line while maintaining their orientation, but also removes the lower part of the legs from each carcass. Because the transfer apparatus is circular and rotary (being of similar size to the rotary transfer conveyor of U.S. Pat. No. 4,178,659), it can be positioned in the limited space between an existing pair of conveyor lines in which manual labour is presently utilized for the transfer operation. As mentioned, the orientation of the carcasses is maintained by the transfer apparatus of the subject invention. This is accomplished because a carcass held by its legs in a certain orientation on the first conveyor line is deposited in a similar orientation on the second line. Thus, operations such as evisceration can be performed on the second conveyor line without requiring that the carcass be re-oriented on that conveyor line. The subject invention is also capable of very high transfer rates—i.e., up to 7500 carcass transfers per hour.

In one form, the apparatus for transferring poultry carcasses hung by their legs from the shackles on a first conveyor line to the shackles on a second conveyor line comprises a generally circular rotary member having on its periphery at equiangularly-spaced positions a series of holding elements. Retention means are associated with the holding elements for retaining on each holding element a poultry carcass. Release means for releasing the hold of the shackle on the first conveyor line on the poultry carcass after that carcass becomes retained on the holding elements are provided. One portion of the path of the first and second conveyor lines is stationed adjacent to respective first and second portions of the path of the periphery of the rotary member. The rotation of the rotary member and movement of the shackles on the two conveyor lines is synchronized such that the movement of the shackles adjacent to the periphery of the rotary member is at the same speed as that periphery. The retention means retains a poultry carcass on a respective holding element as that carcass, which is also held on a shackle on the first conveyor line, becomes adjacent to the periphery of the rotary member. The retention means retains the poultry carcass on the holding element until the rotary member has rotated such that the holding element is adjacent to a shackle on the second conveyor line. At that time, the poultry carcass drops under gravity from the holding element onto the shackle on the second conveyor line to be hung by its legs from that shackle.

The release means may sever that portion of the legs of the poultry carcass holding the carcass on the shackle on the first conveyor line from the remainder of the carcass. The retention means may be at least one stationary guide bar extending adjacent to the path of the periphery of the rotary member. The at least one guide bar acts on each carcass to hold that carcass between that at least one guide bar and the respective holding element. The release means may be a stationary elongate knife mechanism extending adjacent to the path of the periphery of the rotary member. In such an arrangement, the knife mechanism is positioned such that it contacts the legs of the carcass between that position on the legs of the carcass at which the carcass is held on the shackle on the first conveyor line and that position on the carcass at which the carcass is retained by the retention means. The knife mechanism is oriented such that at least a portion of its contacting edge increases the depth of its displacement into the legs of the carcass as the carcass is rotated on the rotary member.

The contacting edge of the knife mechanism may have a first sharp portion which initially contacts the carcass to sever a first portion of the connective tissue extending between two parts of a leg joint, a dull portion which extends between the two parts of the leg joint to increase the separation between those parts, and a second sharp portion which severs a second portion of the connective tissue extending between the two parts of the leg joint. The knife mechanism may have a first blade and a parallel shorter second blade, the two blades being oriented so as to initially contact the carcass together. The second blade has the first sharp portion of the contacting edge of the knife mechanism, and the first blade has the dull portion of the contacting edge. The first blade may also have the second sharp portion of the contacting edge, that second sharp portion being on the trailing edge of the first blade.

The knife mechanism may have a third blade oriented so as to extend in-line with, and behind, the trailing edge of the first blade. In such arrangement, the second sharp portion of the contacting edge of the knife mechanism is partially on the trailing edge of the first blade and partially on the third blade. That part of the second sharp portion of the contact edge that is on the third blade may face at an inclination on the trailing edge of the first blade such that any remnants of the second portion of the connective tissue remaining unsevered after movement across the first and second blades moves against and rides up on the inclined sharp edge of the third blade and is thereby severed. The second blade of the knife mechanism may be positioned radially inwardly on the rotary member from the first blade.

The joint which is contacted by the contacting edge of the knife mechanism may be the hock joint separating the upper part of the leg from the lower part of the leg. If so, the lower part of the leg is held on the shackle on the one conveyor line, and the upper part of the leg is retained with the remainder of the carcass by the retention means. The position of the edge of the first blade that extends between the two parts of the joint may vary radially along the length of that blade such that that edge generally follows the mating surface on the part of the hock joint on the upper part of the leg.

Each of the holding elements may be pivotally connected to the rotary member. The pivot axis of each holding element extends generally tangentially on the rotary member and normal to the symmetry axis of the member. Each holding element may assume alternate angular inclinations relative to the rotary member, a first of those angular inclinations being normally assumed for each holding element and the second of those angular inclination being assumed by each holding element during its movement past the elongate knife mechanism.

Each holding element may comprise a face generally configured to the body contour of a poultry carcass. That face extends generally vertically when the holding element assumes the second angular inclination, and that face inclines downwardly and inwardly when the holding element assumes the first angular inclination. The upper edge of that face is configured such that the upper part of each leg is adapted to be recessed therein with the hock joint being proximate of that upper edge. Each poultry carcass may be held on the shackle on the first conveyor line by the outer end of the lower part of each of its legs. The body of the carcass moves into abutment with the face of the holding element when the carcass becomes adjacent to the periphery of the rotary member. In that configuration, the holding element has the first angular inclination, and the shackle and the attached lower part of the legs are positioned radially inwardly on the rotary member from the upper edge of the face of the holding element. Also, in that configuration the shackle is biased radially inwardly on the rotary member such that the lower part of each of the legs is placed in tension.

In the foregoing construction, the elongated knife mechanism is positioned radially inwardly from, but proximate of, the path of the upper edge of the face of the holding element. The knife mechanism is adapted to contact the hock joints of the carcass positioned proximate of that upper edge.

The retention means may comprise a stationary guide bar extending adjacent to the path of the periphery of the rotary member and in spaced relation to the upper edge of the face of the holding element. The stationary guide bar is adapted to act against the upper part of each leg when that leg is recessed in the upper edge of that face. A second stationary guide bar may extend adjacent to the path of the periphery of the rotary member and in spaced relation to a lower edge of the holding element. The second guide bar is adapted to provide support to assist in retaining the carcass on the holding member.

In another form, the invention is a method for transferring a poultry carcass held by the lower part of its legs on a shackle on a first conveyor line to a shackle on a second conveyor line. The method comprises the initial step of moving the carcass on the one conveyor line until the carcass abuts against a corresponding holding element on the periphery of a rotary member positioned between the first and second conveyor lines. The shackle on the first conveyor line during such movement maintains its hold on the lower part of the legs of the carcass. The first and second conveyor lines are configured such that each of their paths extend adjacent to a respective different portion of the path of the periphery of the rotary member. The method comprises the second step of rotating the rotary member. That rotation brings the holding element adjacent to a stationary retention means. That retention means, which acts to retain the carcass on the holding element, extends adjacent to the path of the periphery of the rotary member between the portion of that path adjacent to the first conveyor line and that portion of that path adjacent to the second conveyor line. The third step of the method involves severing the lower part of the legs of the carcass from the remainder of the carcass in that portion of the path of the periphery of the rotary member that is adjacent to the first conveyor line. The severing is by means of a stationary knife mechanism positioned to extend adjacent to and along that portion of the path of the periphery of the rotary member. The knife mechanism is positioned radially outwardly of the rotary member between the path of the shackle on the first conveyor line and the path of the corresponding holding element. The final step of the method involves dropping the remainder of the carcass from the rotary member onto the shackle on the second conveyor line in that portion of the path of the periphery of the rotary member adjacent to the second conveyor line. The retention means terminates its adjacency to that path immediately prior to the position at which the carcass is dropped.

The first and second conveyor lines may each have a generally rectangular configuration with one portion of the first and second conveyor lines each being one of the smaller ends of the respective rectangular configuration. In this arrangement, the conveyor line corners adjacent to the rotary member are rounded. The apparatus may further comprise a shackle guide means at each of the rounded corners. Each of the shackle guide means comprises a rotatable shaft pivotally secured to the frame of the apparatus such that its axis of rotation is parallel to that of the generally circular rotary member. A series of discs is symmetrically secured to the rotatable shaft. The discs are secured such that a portion of the path of the periphery of each disc is adjacent to the portion of the respective first or second conveyor lines at the respective rounded corner. Each shaft rotates such that the periphery of each of the discs secured thereto has a speed corresponding to that of the shackles moving on the respective first or second conveyor lines.

At least one of the discs secured to each rotatable shaft may have a series of brackets extending around its periphery spaced such that the stem of a shackle moving on the respective first or second conveyor lines adjacent to that periphery extends between an adjacent pair of brackets. In this embodiment, each of the shackle guide means also comprises a pair of arcuate guide bars secured to the frame of the apparatus to extend along that portion of the path of the periphery of the at least one of the discs that is adjacent to the portion of the respective first or second conveyor lines at the respective rounded corner. One of the arcuate guide bars is positioned radially outwardly of the path of the shackle moving on the respective first or second conveyor line. The other arcuate guide bar is positioned radially inwardly of the path of that shackle. In this configuration, a shackle moving around the rounded corner of a respective one of the first or second conveyor lines is restrained radially during such movement by the pair of arcuate guide bars and is restrained angularly during such movement by an adjacent pair of brackets on the periphery of the at least one of the discs.

The arcuate guide bar that is positioned radially inwardly on the shackle guide means that is positioned on the upstream side of the second conveyor line may extend along at least a part of the second portion of the path of the periphery of the rotary member. Each of the holding elements may have a projecting nose adapted to engage with a respective one of the shackles on the second conveyor line during movement of that shackle along the second portion of the path of the periphery of the rotary member. In this arrangement, the arcuate guide bar retains the shackle on the nose of the respective holding element while a poultry carcass on the respective holding element drops under gravity into the shackle. Each of the holding elements may have a push rod means slidably connected thereto to move generally radially on the apparatus. Each such push rod means is actuated to slide generally radially outwardly by contact with an arm pivotally secured to the frame of the apparatus in a biased position. Such actuation occurs after movement of the respective holding element past the terminal end of the retention means. The push rod means pushes the poultry carcass away from the respective holding element during such actuation.

BRIEF DESCRIPTION OF THE DRAWINGS

The apparatus of the subject invention will now be more fully described with reference to a preferred embodiment, utilizing the accompanying drawings.

FIG. 9A is a perspective side view of the carriage member mounted on the transfer apparatus at the position marked IX in FIG. 1.

FIG. 9B is a detailed sectioned view of the relative positions of the hock joint and the knife mechanism of FIG. 9A.

FIG. 10A is a perspective side view of the carriage member mounted on the transfer apparatus at the position marked X in FIG. 1.

FIG. 10B is a detailed sectioned view of the relative positions of the hock joint and the knife mechanism of FIG. 10A.

FIG. 11 is a perspective side view of the carriage member mounted on the transfer apparatus at the position marked XI in FIG. 1.

DETAILED DESCRIPTION OF THE PRESENTLY PREFERRED EMBODIMENT

Figure 1:
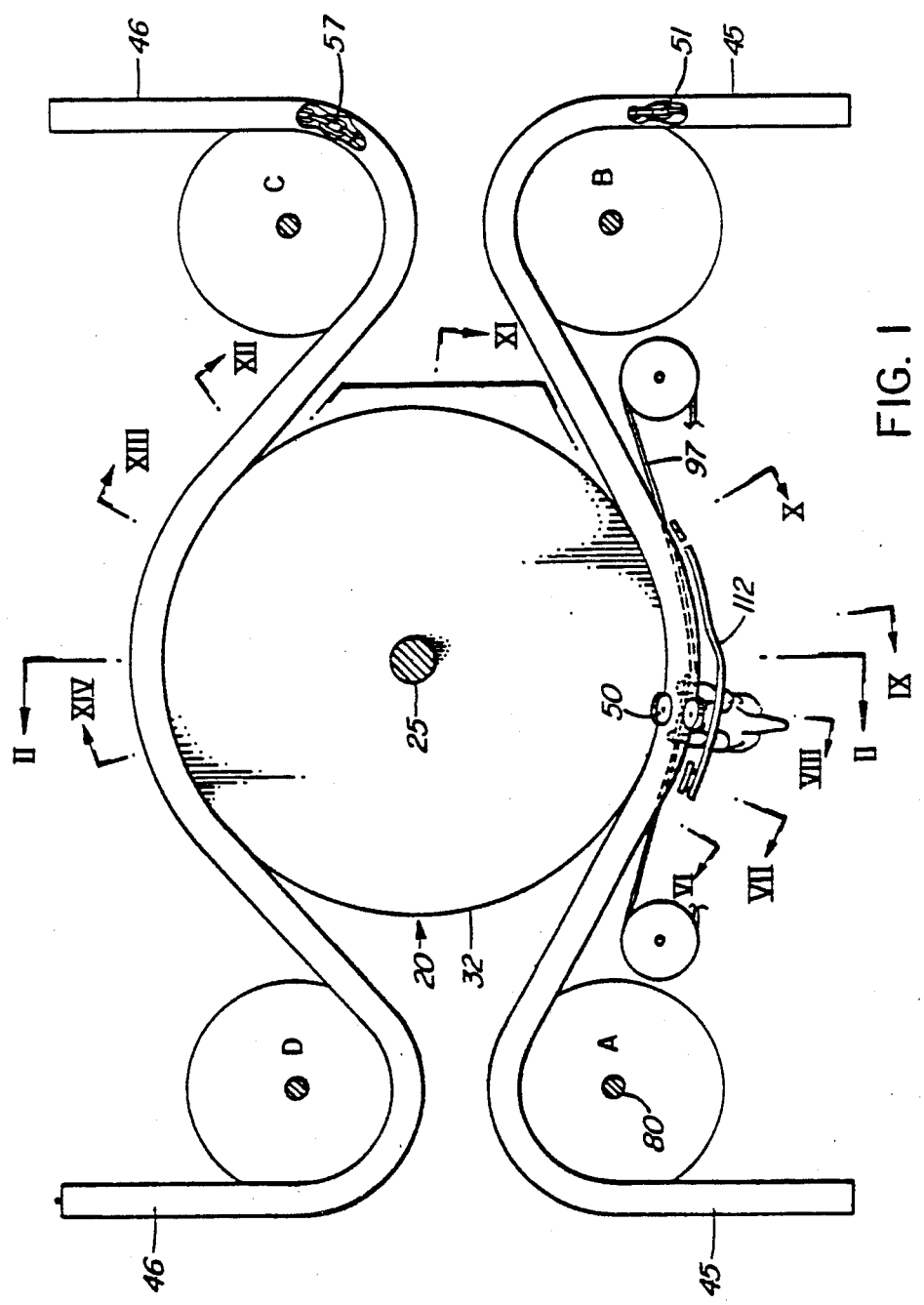
FIG. 1 is a plan view of a transfer apparatus embodying the subject invention.

With reference to FIG. 1, the transfer apparatus has a rotary member or carousel generally designated as 20. Rotary member 20 is generally shown in side view in FIG. 2, that view being taken along the section II—II of FIG. 1. Rotary member 20 is mounted in a frame generally designated as 21. Frame 21 comprises a series of vertical members 22, a series of upper cross members 23, and a series of lower cross members 24. Rotary member 20 is mounted on a shaft 25. The rotary member 20 is mounted generally centrally in the frame 21 between an upper bearing 26 connected to one of the upper cross members 23 and a lower bearing (not shown) mounted in a cradle 27 supported by the lower cross members 24. The lower end of the shaft 25 extends through the lower bearing and has a gear wheel 28 mounted to its lower end. The gear wheel 28 is connected by a chain 29 to the output sprocket of a reduction gear box (not shown) driven by a motor (not shown). An alternate means for rotating rotary member 20 will subsequently be described.

A pair of discs 30 and 31 are mounted on the shaft 25 normally of the rotational axis. A stainless steel drum 32 has its ends mounted on the outer perimeter of the discs 30 and 31. Approximately one-third of the distance from the lower edge of the drum 32, a pair of rings 33 and 34 are mounted concentrically on the drum 32 in a generally parallel orientation. The purpose of the pair of rings 33 and 34 will subsequently become clear. The drum 32 has a first set of teeth 36 and a second set of teeth 37 extending circumferentially therearound. The second set of teeth 37 is positioned above the first set of teeth 36. The purpose of the two sets of circumferential teeth on the drum 32 will subsequently be described.

With reference to FIG. 1, rotary member 20 is surrounded by four small rotary members, generally designated as A, B, C, and D, each mounted on a shaft. The shaft of each of those four small rotary members is secured at its upper and lower ends by bearings to frame 21. Also shown in FIG. 1 are first and second conveyor lines having tracks 45 and 46, respectively. The first conveyor line, to which track 45 belongs, is the "kill line" of the poultry plant. The poultry are slaughtered and their feathers and claws removed along this line. The second conveyor line, to which track 46 belongs, is the "evisceration line". The poultry are eviscerated and their heads removed along this line.

Figure 2:
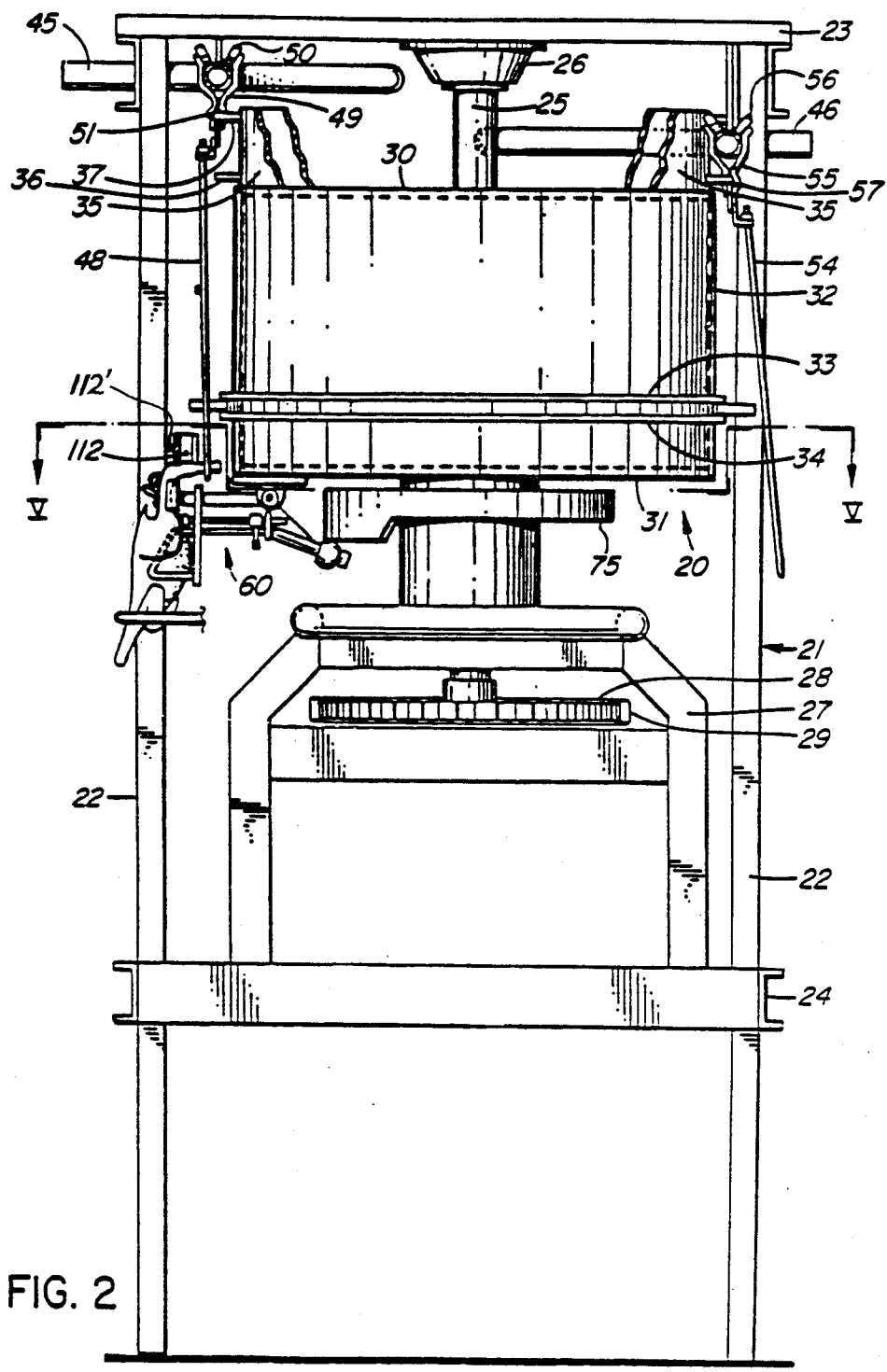
FIG. 2 is a partially-sectioned view of the transfer apparatus, that view being taken through II—II of FIG. 1.

The first and second conveyor lines each have a series of shackle assemblies mounted to move along their tracks. Those shackle assemblies are generally illustrated in FIGS. 1, 2, 3, and 4. The tracks 45 and 46, which are circular in cross-section, are secured to the frame 21. Each shackle assembly on the first conveyor line consists of a shackle 48 secured to extend from a yoke. The yoke consists of a pair of connected brackets 49. Each bracket has a wheel 50 rotatably mounted thereon, as shown in FIG. 2. A portion of a chain 51 extending below the track 45 is secured to each shackle assembly and acts to provide proper spacing between those assemblies, as well as to provide propulsion to those assemblies. The propulsion for the first conveyor line is provided by the meshing of the upper set of teeth 37 on the drum 32 with the vertical chain links of the chain 51. Each of the teeth 37 is circumferentially spaced to extend through the center of adjacent vertical links in the chain 51.

Figure 3:
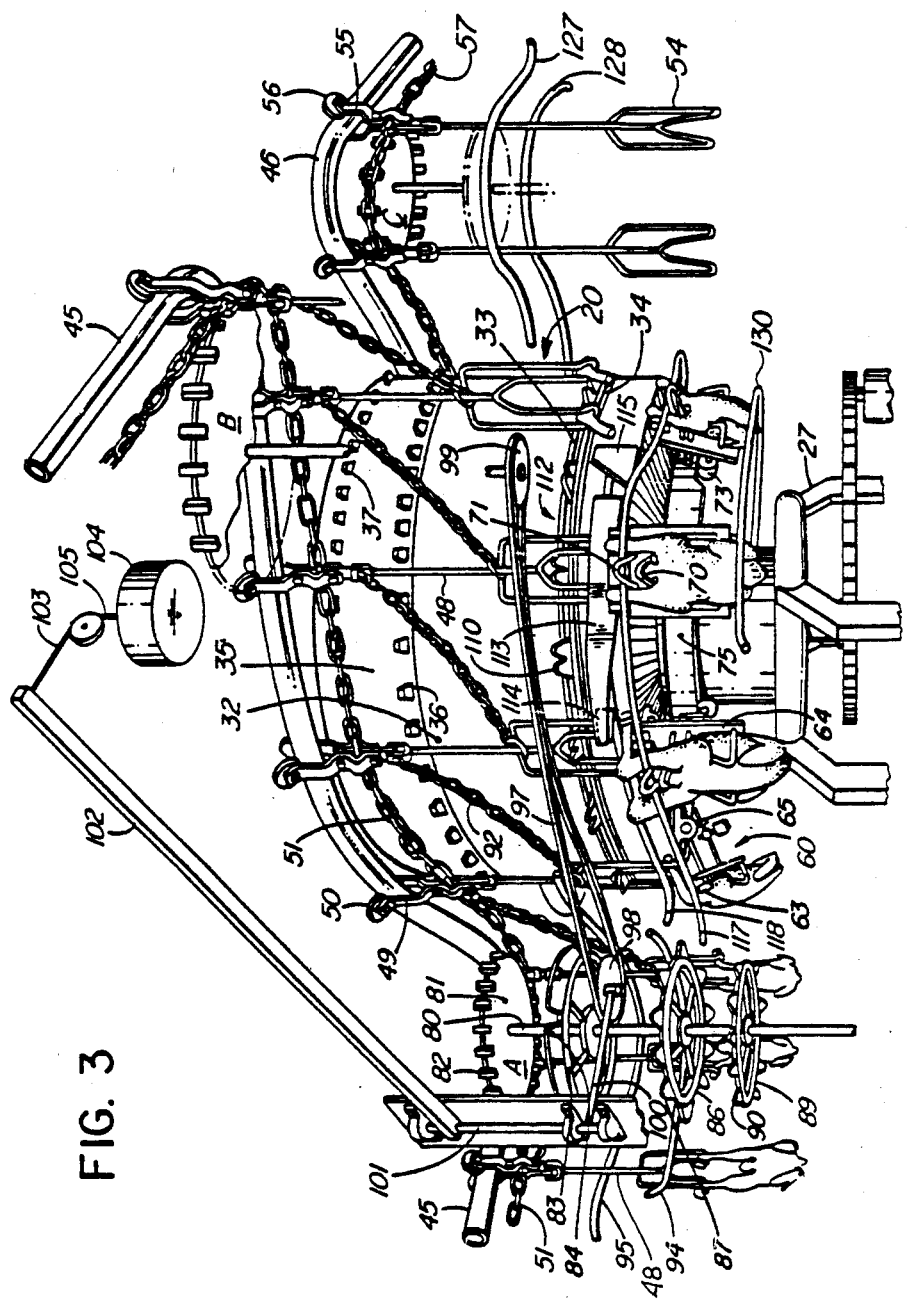
FIG. 3 is a side perspective view of the transfer apparatus, that view being from the left side of FIG. 1.
Figure 5:
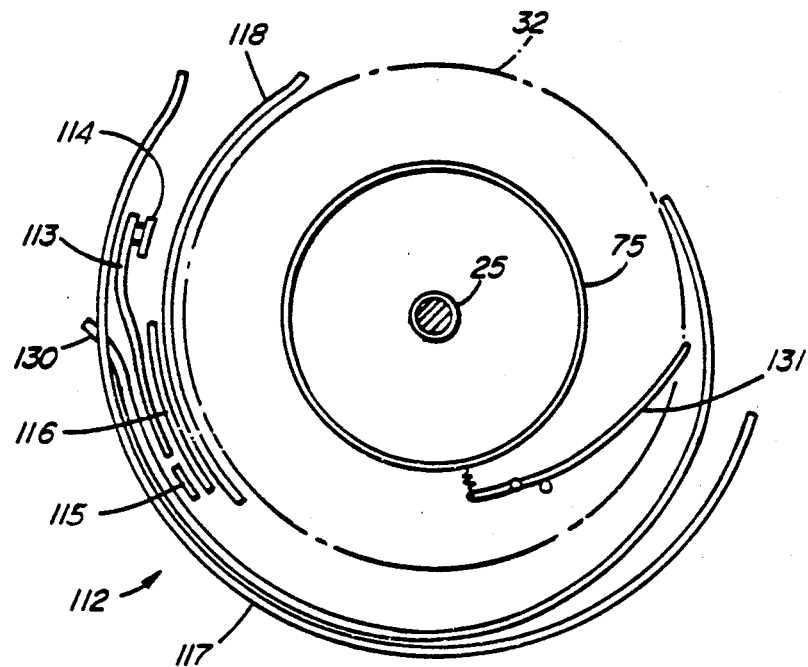
FIG. 5 is a partially-sectioned plan view of the transfer apparatus along the section V—V of FIG. 2.

With respect to FIGS. 1, 3 and 5, rotation of the rotary member 20 moves the shackle assemblies on the track 45 clockwise. That is, they move clockwise around the small rotary member A, counter-clockwise around the rotary member 20, and clockwise around the small rotary member B.

Figure 4:
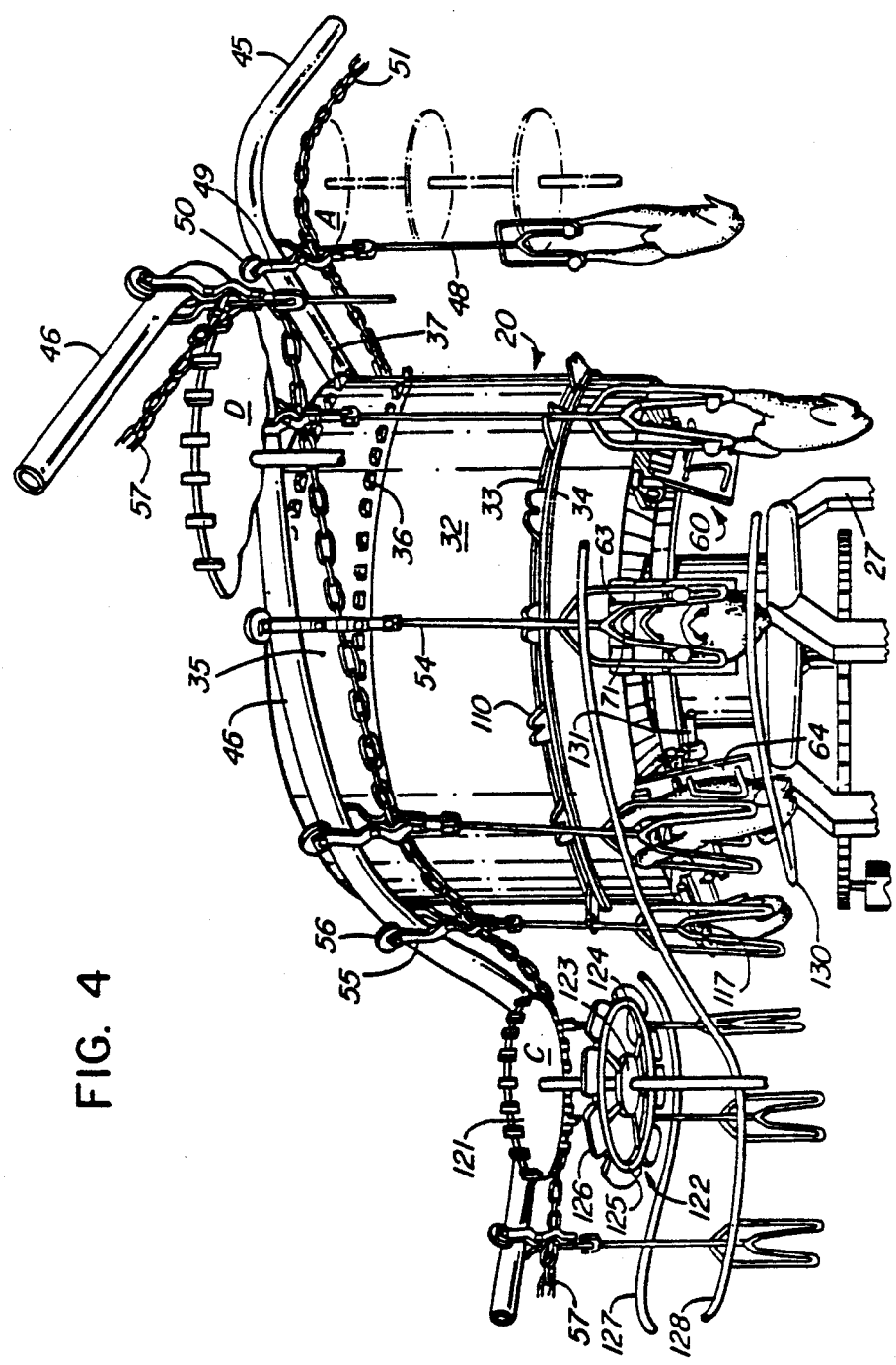
FIG. 4 is a side perspective view of the transfer apparatus, that view being from the right side of FIG. 1.

With reference to FIGS. 1 and 4, a portion of the track 46 extends on an opposite side of the rotary member 20 from the track 45. Shackle assemblies move in a clockwise direction on the track 46. That is, they move clockwise around the small rotary member C, counter-clockwise around the rotary member 20, and clockwise around the small rotary member D. As with the shackle assemblies on the first conveyor line, each shackle assembly on the second conveyor line comprises a yoke and an attached shackle. The shackle is designated 54. The yoke attached to its upper end consists of a pair of brackets 55 on each of which is mounted a wheel 56. A chain 57 extends below the track 46. The chain 57 is secured to the pair of brackets 55 to provide appropriate spacing and propulsion to the shackle assemblies of the second conveyor line. The lower set of teeth 36 on the drum 32 mesh with the chain 57. Each of the teeth 36 extends through one of the vertically-oriented links of the chain 57.

As can be seen from FIGS. 3 and 4, each shackle 48 on the first conveyor line is differently configured from each shackle 54 on the second conveyor line. Both types of shackles have a long stem which extends downwardly from the yoke suspending it from the track, but there are differences in the configuration of the lower portions of each kill shackle 48 and each evisceration shackle 54. Those differences are the greater length of each shackle 48, the horizontal cross-piece on each shackle 48, and the out-of-plane curvature on the lower tips of each shackle 48. As will subsequently be more fully described, a poultry carcass hangs from each shackle 48 by the outer end of the lower part of its legs, whereas each shackle 54 retains a carcass by the remaining part of the hock joints after the lower part of the legs has been removed on the rotary member 20.

Figure 6:
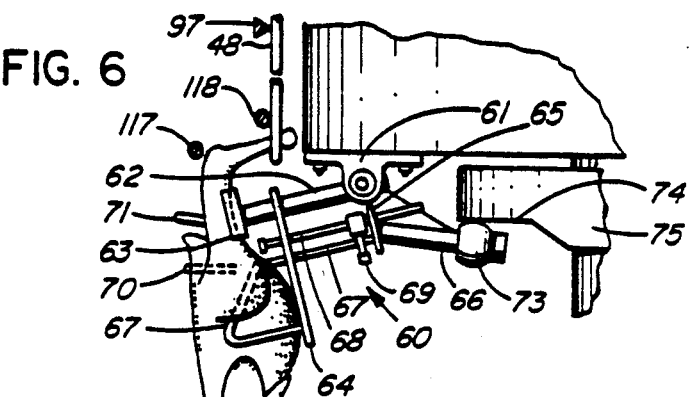
FIG. 6 is a perspective side view of a carriage member mounted on the transfer apparatus at the position marked VI in FIG. 1.

Secured to the lower disc 31 on the rotary member 20 so as to extend adjacent to the lower edge of the drum 32 are a series of tiltable carriages generally designated as 60. Approximately twenty such carriages are positioned at equiangularly spaced intervals adjacent to the lower periphery of the drum 32. The exact number depends upon the distance between the shackes on the conveyor lines (that distance being the same on both lines) and on the diameter of the drum 32. In the presently preferred embodiment, the shackles are spaced approxiately 6 inches apart, the drum 32 is 36.3 inches in diameter, and nineteen carriages 60 are secured to the disc 31. As shown in FIG. 6, each carriage 60 has a support bracket 61 to which is pivotally secured one end of an elongated support arm 62. The other end of the support arm 62 has secured thereon a specially-configured support rest 63. The upper part of the lgs of the poultry are positioned against the support rest 63. A plate 64 is secured intermediate of the ends of, and normal to, the support arm 62. The support arm 62 extends through and is welded to the plate 64 proximate of one edge of that plate. A smaller plate 65 extends parallel to the plate 64 at the pivotal connection to the support bracket 61. Extending on an opposite side of the pivotal connection from the support arm 62 is a lever arm 66. The lever arm 66 is angularly offset from the support arm 62.

Extending between and rigidly secured to the plates 64 and 65 are a pair of rods 67. Each rod 67 is welded to the plates 64 and 65 to maintain those plates in co-planar spaced relation. Each rod 67 extends through the plate 64 and is configured into an arm to create a centering guide for a poultry carcass suspended from the support rest 63. Slidably mounted to extend through both plates 64 and 65 are a pair of push rods 68 having an enlarged end existing beyond the plate 64. An adjustably-positionable cam member 69 is fixed to the push rod 68 intermediate of the plates 64 and 65.

An arcuate guide bar 70, shown in FIGS. 3 and 6, is welded to the plates 64 and 65 and extends between those plates. The arcuate guide bar 70 has its arcuate central portion extending generally normal to, and on the outer face of, the plate 64 below the support rest 63. A further arcuate guide bar 71 is fixed to the support rest 63 to extend outwardly from the support rest 63 at a slight upward angle.

On the radially inner end of the lever arm 66 an annular wheel 73 is mounted. The wheel 73 rides on a ring-like surface 74 defined by the lower edge of a stationary circular cylinder 75 mounted on the cradle 27 therebelow. As shown in the series of drawings, FIGS. 6 to 14 inclusive, each carriage may assume either a first, generally horizontally position as in FIGS. 7, 8, 9, and 10, or a second, inclined position as shown in FIGS. 6, 11, 12, 13, and 14. The reason for, and the relative positioning of, the two angular inclinations of each carriage 60 should subsequently become clear.

With the first and second conveyor lines extending around the small rotary members A, B, C, and D, as previously described, a poultry carcas entering the apparatus on the first conveyor line (see FIG. 1) moves clockwise around the small rotary member A, counter-clockwise for almost a complete revolution of the rotary member 20, and clockwise around the small rotary member D. Once a poultry carcass has moved around the small rotary member A to become adjacent to the rotary member 20, a retention means secures the carcass to the rotary member 20. Almost immediately thereafter, the hold of the first conveyor line on the carcass is removed. The carcass is then retained on the rotary member 20 for approximately a further one-half rotation of that member. At that point, the grip of the retention means on the carcass is released, and the carcass falls under gravity onto one of the shackle assemblies moving along the second conveyor line. The release of the first conveyor line on the poultry carcass is obtained by serving the lower part of the legs of the carcass at the hock joint after the carcass has been retained on the hock joint after the carcass has been retained on the rotary member 20. The lower part of the legs of the carcass remain on the shackle assembly of the first conveyor line and are carried off around the small rotary member B to be disposed of before the shackle assembly is loaded with a further poultry carcass.

Each of the small rotary members A, B, C, and D has a central axle fixed to the frame 21 of the apparatus. On each axle, a driving disc extends normal to the axle and has its center rigidly connected to the axle. A series of teeth extend around the periphery of each driving disc so as to be adjacent to the vertically-oriented links of the chain of the respective conveyor line. With reference to FIG. 3, the small rotary member A has an axle 80 to which is ridigly connected a driving disc 81. The driving disc 81 has a series of teeth 82 extending on its periphery. The teeth 82 are equiangularly spaced from each other such that adjacent ones of the teeth engage adjacent vertical links of the chain 51. It can be appreciated that this construction results in the four small rotary members rotating in synchronized relation with the rotary member 20.

In the preferred embodiment, the rotary member 20 is rotatably powered by its connection to a motor, and the four small rotary members are rotatably powered by their positive engagement with the chains 51 and 57 which also positively engage the rotary member 20. A possible alternate method of powering the apparatus is to directly drive one or more of the small rotary members by a motor. That small rotary member or members in turn would provide rotational power to the other rotary members. In particular, by providing driving power to either the small rotary members A and C or to the small rotary members B and D, a reduction in the amount of the driving power required may be realized.

Besides their driving discs 81, small rotary members A and D each have three further discs extending normally to their axle. Each disc is rigidly connected at the center to the axle. As shown in FIG. 3, a disc 83, which is immediately below the driving disc 81, has a series of wire brackets 84 extending on its periphery. The spacing between each adjacent pair of the brackets 84 is just large enough to receive the stem of a shackle 48 therein. Alternatively, the brackets 84 could be formed from nylon sheet. The purpose of the disc 83 is to position and stabilize the shackle assemblies as they are carried around the small rotary member A at high speed.

Below the disc 83 is a further disc 86 having a diameter similar to the diameters of the discs 81 and 83. As with the disc 83, the disc 86 is utilized for positioning and stabilizing shackle assemblies moving around the small rotary member A. The disc 83 has ten adjacent brackets 84 around its periphery. Each plastic spacer 87 is adapted to extend between the inner pair of legs at the lower end of the shackle 48, as shown in FIG. 3.

The fourth and lowest disc fixed to the axle 80 is a disc 89 which has a series of ten wire brackets 90 equiangularly positioned arounds its periphery. Each poultry carcass is adapted to extend down between an adjacent pair of the brackets 90. As can be seen from FIG. 3, each of the brackets 90 is centered below one of the brackets 84, whereas each of the plastic spacers 87 are angularly positioned between adjacent brackets on the discs 81 and 89.

Since the small rotary members B and C do not have poultry carcasses moving the therearound, it can be appreciated that the lower pair of discs (i.e., the discs 86 and 89) are not required on the small rotary members B and C. Those two rotary members have only a driving disc 81 to contact the chain on their respective conveyor lines and a disc similar to disc 83 to prevent excessive sway of the shackles as they move around those small rotary members.

With respect to the first conveyor line, each of the shackle assemblies is connected by a chain 92 to each of the shackle assemblies two positions removed from it. With reference to FIG. 3, it should be mentioned at this time that only every second shackle assembly has been illustrated to enhance clarity. It can be seen that each of the stabilizing chains 92 extends from the pair of brackets 49 at the top end of each shackle assembly to connect to that position on the second-following shackle assembly at which the cross-piece and the stem of the shackle intersect.

A further way in which the motion of the shackle assemblies is stabilized during travel around the small rotary members and the rotary member 20 is by means of guide bars 94 and 95 extending around the periphery of the small rotary members as illustrated in FIG. 3. The small rotary members A and C generally have an outer guide bar and an inner guide bar extending around that portion of the periphery to which the shackle assemblies move adjacently. As an illustration, FIG. 3 illustrates an inner guide bar 94 positioned inside of the path of the shackles 48 and an outer guide bar 95 positioned outside of the path of the shackles 48. The shackles 48 are accordingly constrained to very limited radial movement as they move around the small rotary member A. Similarly, the shackles 54 are positioned between an outer guide bar 127 and an inner guide bar 128.

A still further means of stabilizing the movement of the shackle assemblies involves a tensioning belt 97 mounted to extend between a first pulley 98 and a second pulley 99, as shown in FIG. 3. The second pulley 99 is pivotally connected to the frame 21 of the apparatus, whereas the first pulley 98 is pivotally connected to one end of an arm 100. The other end of the arm 100 is rigidly connected to one end of a shaft 101. One end of the shaft 100 in turn is pivotally connected to the frame 21 of the apparatus. The other end of the shaft 101 is rigidly connected to one end of an extended arm 102. The other end of the extended arm 102 is laterally acted on by a cable 103 connected to a suspended weight 104 by a pulley 105. The belt 97 is placed in tension by this arrangement and acts to press radially inwardly on the shackles 48 as they move tangentially on the rotary member 20. Thus, the shackles 48 are restrained against radially outward movement on the rotary member 20. A further reason for the need for the tension belt 97 will subsequently become obvious.

It was earlier mentioned that the drum 32 has a pair of spaced rings 33 and 34 extendig around its periphery approximately one-third of the height of the drum 32 from its lower edge. The purpose of the rings 33 and 34 is to hold plastic spacers 110 as shown in FIGS. 3 and 4. Spacers 110 are utilized to further stabilize the shackle assemblies as they move around the periphery of the rotary member 20. From a comparison of FIGS. 3 and 4 it can be seen that each spacer 110 occupies a different position relative to a shackle 48 on the input conveyor line than it does to a shackle 54 on the output conveyor line. This is due not only to the fact that the track of the output conveyor line is lower than the track of the input conveyor line, but also to the fact that the shackles 54 are longer than the shackles 48. It can be seen that the lower tip of each shackle 48 extends generally adjacent to the lower edge of the drum 32, whereas the lower end of the stem of each of the shackles 54 is adjacent to the lower edge of the drum 32 and the remainder of each shackle 54 extends below that edge.

As a poultry carcass moves counterclockwise around the periphery of the rotary member 20 between small rotary members A and D (see FIG. 1), the lower part of the legs is removed from each carcass at the hock joint by a knife mechanism generally designatd as 112 (see FIGS. 3 and 5). The knife mechanism 112 extends proximate of a portion of the lower edge of the drum 32 and is supported by an arm 112' extending from one of the vertical members 22 (see FIG. 2). The knife mechanism 112 consists of three separate blades, 113, 114, and 115 connected in the configuration illustrated in FIGS. 3 and 5.

The blades 114 and 115 are shorter than the blade 113. The blade 114 extends in space parallel relation to the leading portion of the blade 113, and the blade 115 extends in-line with the trailing portion of the blade 113. The blade 114 has a sharp lower edge, and that blade increases depth between its leading and trailing edes.

The blade 113 has the curved profile illustrated in FIG. 5. The leading portion of the blade 113 extends in an arc positioned further from the symmetry axis of the rotary member 20 than does an arc along which the trailing portion extends. The leading portion of the blade 113 increases in depth along its length and has a dull lower edge. The trailing portion of the blade 113 has a generally uniform depth and a sharp lower edge.

The blade 115 extends generally in-line with the trailing portion of the blade 113. It has a sharp front edge inclined such that the upper end of that edge is further displaced from the blade 113 than is the lower end. Also, for a reason that will subsequently be explained, the lower end of the blade 115 commences at an elevation on the apparatus slightly below that of the sharp trailing edge of the blade 113.

Instead of being connected to the frame of the apparatus, the forward end of blade 113 may have an eccentric pulley mounted thereon. In that case, rotation of the pulley creates a vertical oscillatory motion. In such a case, the forward end of the blade 113 would be held on the frame 21 of the apparatus by a spring or similar means. The trialing end of the blade 113, instead of being connected to the frame 21 of the apparatus, may be resiliently supported on the frame 21 through a spring steel strip.

As shown in FIGS. 5, 9 and 10, a support bar 116 is mounted to the end of the knife mechanism 112 or to the frame 21 of the apparatus to extend proximate of, and radially inwardly on the apparatus from, the lower edge of both the blade 115 and the trailing portion of the blade 113. The purpose of the support bar 116 will become evident when the operation of the apparatus is described.

A pair of peripheral guide bars 117 and 118 are secured to the frame 21 of the apparatus to extend proximate of and in spaced relation to the lower edge of the drum 32. The guide bar 117 extends adjacent to approximately half the perimeter of the drum 32, as can be seen in FIGS. 3 and 4. The guide bar 117 is radially positioned relative to the rotary member 20 so as to extend in almost touching relationship with the support rest 63 of each carriage 60. That portion of the guide bar 117 between small rotary members A and B is positioned slightly higher and radially inwardly from the remaining portion of the guide bar 117. A short sloping portion of the guide bar 117 connects those other two portions. The reason for the change in the vertical elevation and radial position of the two portions of the guide bar 117 is to accommodate the change of inclination of each carriage 60 during rotation of the rotary member 20.

As can be seen from FIG. 3, the guide bar 118 is shorter than the guide bar 117 and is positioned radially inwardly from the guide bar 117 on the rotary member 20. The guide bar 118 is positioned to extend in a horizontal plane approximately one inch higher than the horizontal plane along which the initial portion of the guide bar 117 extends. The lower edge of the blade 113 slopes downwardly along its dull leading portion and extends between the guide bars 117 and 118 such that the dull leading edge of the blade 113 is below the guide bars 117 and 118. The lower trailing portion of the guide bar 118 is positioned sufficiently below the lower end of shackle assemblies moving thereacross on the track 45 so that no interference results. Also, as can be seen from FIG. 3, the initial portions of the guide bars 117 and 118 are curved so as to accommodate movement thereagainst of carcasses being rotated on the rotary member 20. Similarly, the other guide bars on the apparatus, such as the guide bars 94 and 95, have their forward ends turned so as to make a smoother initial contact with the shackles.

FIG. 4 is a perspective view of that portion of the rotary member 20 lying between the small rotary members C and D. As with the small rotary member B, the small rotary member C has only two discs, a driving disc 121 which engages with the chain 57 of the second conveyor line and a second disc 122 mounted under the driving disc 121 to engage the stems of the shackles 54. The second disc 122 may be in the form of a wheel having a hub 123. Five equiangularly spaced spokes 124 extend from the hub 113. The spokes 124 connect to a rim 125 on which are mounted ten equiangularly-spaced plastic spacers 126. The spacers 126 are designed to better receive the stems of the shackles 54.

The outer guide bar 127 is mounted on the frame of the apparatus to extend along the periphery of the small rotary member C. The guide bar 128, which is longer than the guide bar 127, also extends around that periphery and extends also around a portion of the periphery of the rotary member 20. A shackle assembly being pulled along the track 46 by the chain 57 enters between the outer guide bar 127 and the inner guide bar 128, as shown in FIG. 4, and the stem of the shackle 54 of that assembly is caught between a pair of adjacent plastic spacers 126 during its movement around the small rotary member C. The shackle assembly (which at this point is empty) is stabilized by its confinement between the two guide bars 127 and 128 and the plastic spacers 126. Without such stabilization, the shackles would not remain generally vertical, but would extend at an angle to the vertical due to inertia and drag created by contact with the guide bars 127 and 128.

As shown in FIGS. 3, 4, 9A, 10A, and 11 to 14, a further guide bar 130 extends around the periphery of the rotary member 20 from approximately midway between the small rotary members A and B to approximately midway between the small rotary members C and D. The guide bar 130 is positioned radially outside of, but proximate to, the path follwed by the lower edge of the carriages 60. Between the small rotary members C and D, the guide bar 130 extends radially inwardly, the terminal portion of the guide bar 130 being generally below the path traced by the pivot axes of the carriages 60. The purpose of the guide bar 130 will become clear when the operation of the subject apparatus is described.

Figure 12:
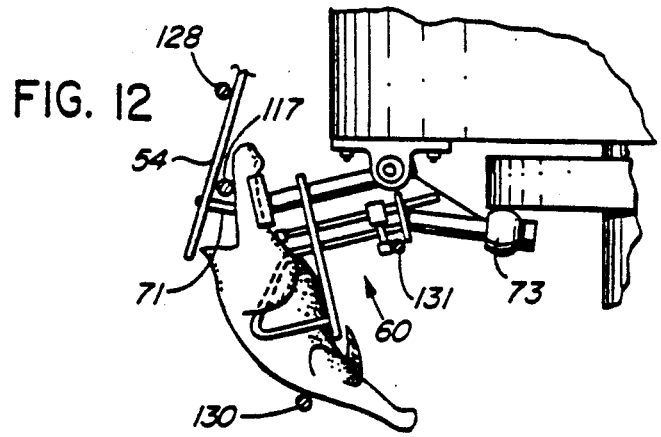
FIG. 12 is a perspective side view of the carriage member mounted on the transfer apparatus at the position marked XII in FIG. 1.
Figure 13:
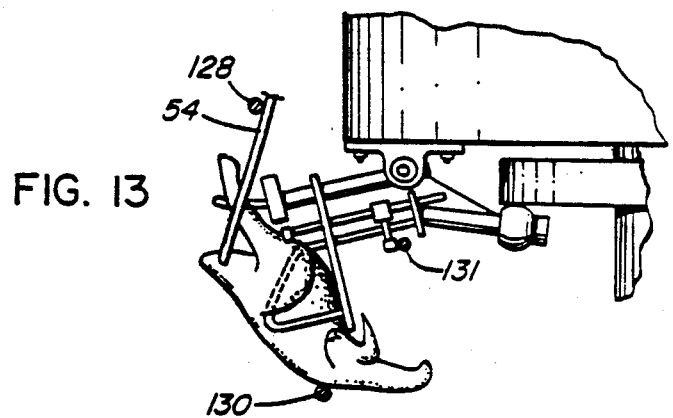
FIG. 13 is a perspective side view of the carriage member mounted on the transfer apparatus at the position marked XIII in FIG. 1.
Figure 14:
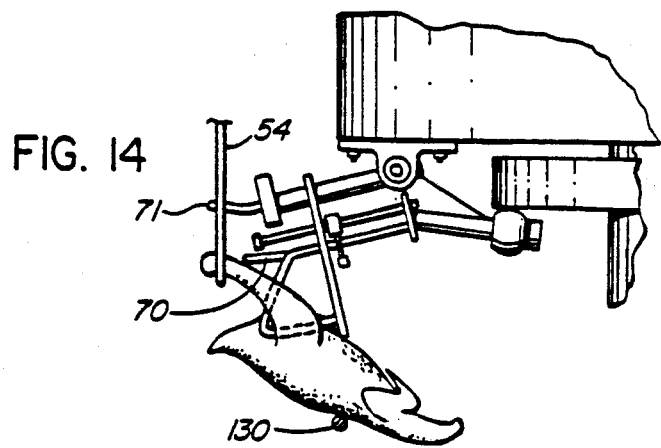
FIG. 14 is a perspective side view of the carriage member mounted on the transfer apparatus at the position marked XIV in FIG. 1.

A pivotally-mounted biased arm 131 extends under the lower disc 31 on the rotary member 20 in a direction oriented radially outwardly in a counterclockwise direction. The radially-outward end of the arm 131 extends into the path of the cam member 69 on each carriage 60. As each carriage 60 is rotated on the rotary member 20, the cam member 69 abuts against the radially-outward end of the arm 131. The push-rod 68 to which the cam member 69 is attached is slid outwardly on the carriage 60 by such abutment, as shown in FIGS. 12 and 13.

The operation of the subject apparatus will next be described in terms of the transfer of a poultry carcass from the first conveyor line to the second conveyor line. Removal of the lower part of the legs of the carcass occurs during the transfer.

With reference to FIG. 3, a poultry carcass held on a shackle 48 suspended by a yoke from the track 45 is pulled along the track 45 by the chain 51. The chain 51 in turn is powered by the motor-driven rotation of the rotary member A, the stem of the shackle 48 enters between an adjacent pair of the brackets 84 on the disc 83, a spacer 87 on the disc 86 moves between the inner legs of the shackle 48, and a pair of adjacent brackets 90 on the disc 89 assume opposite positions on the carcass. The shackle 48 is also constrained to move between the inner guide bar 94 and the outer guide bar 95.

As the carcass becomes adjacent to the drum 32, the lower part of its legs are pulled across the support rest 63 of an associated carriage 60. The upper part of the legs come into abutment with a pair of specially-contoured recesses in the support rest 63. The carriage 60 is in the inclined position at that location. The annular wheel 73 of the carriage 60 rides on the higher portion of the ring-like surface 74. The shackle 48 supporting the carcass assumes a radially-inward position on the rotary member 20 relative to the support rest 63 such that the lower part of the legs of the carcass are stretched between the jaws of the shackle 48 and the support rest 63. The arcuate guide bars 70 and 71 extend between the upper part of the legs of the carcass on the support rest 63. The lower end of the shackle 48 is initially directed radially-inwardly on the rotary member 20 by the inner guide bar 94, but the inwardly-directing force is subsequently applied by the tensioning belt 97. The weight 104 is adjusted such that the tensioning belt 97 applies the appropriate force to the stem of the shackle 48 to create the appropriate tension in the lower part of the legs of the carcass. Simultaneously with the tensioning force applied on the shackle 48, the carriage 60 rotates to a generally horizontal position when the annular wheel 73 rides onto a lower portion of the ring-like surface 74. The change in orientation of the carriage 60 can be seen clearly in FIGS. 6 and 7. As the carriage 60 rotates to a horizontal position, the legs of the carcass move into abutment with the peripheral guide bars 117 and 118. The upper part of the legs of the carcass are sandwiched between the support rest 63 and the peripheral guide bar 117, the hock joint sitting above that position and preventing downward movement of the carcass on the carriage 60. The lower part of the legs of the carcass are pushed upwardly into abutment against the peripheral guide bar 118, that guide bar preventing the outer end of the lower part of the legs of the carcass from riding up in the jaws of the shackle 48. The pair of rods 67 secured to the plate 64 prevents sideways movement of the carcass on the carriage 60, and the arcuate guide bar 70 on the plate 64 also assists in holding the carcass in position.

Figure 7B:
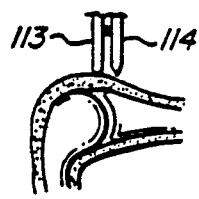
FIG. 7B is a detailed sectioned view of the relative positions of the hock joint and the knife mechanism of FIG. 7A.
Figure 7A:
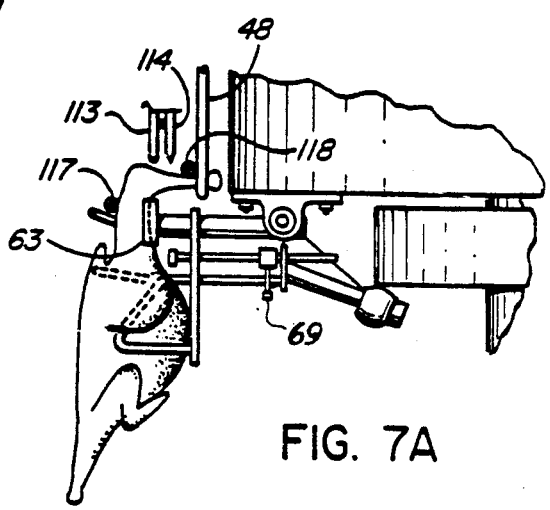
FIG. 7A is a perspective side view of the carriage member mounted on the transfer apparatus at the positioned marked VII in FIG. 1.
Figure 8:
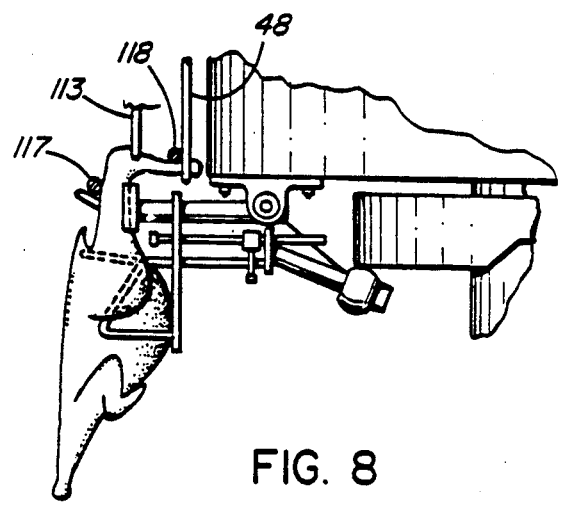
FIG. 8 is a perspective side view of the carriage member mounted on the transfer apparatus at the position marked VIII in FIG. 1.

With rotation of the rotary member 20, the hock joints above the support rest 63 simultaneously move under the dull edge of the blade 113 and the sharp edge of the blade 114. The blade 114 severs tendons extending on the upper surface of the lower part of the leg of the carcass, and the blade 113 moves downward between the two parts of the hock joint to separate those two parts, the connective tissue between those parts being thereby stretched. As can be seen in FIG. 7, the blade 113 is positioned radially inwardly of but adjacent to the support rest 63, and radially outwardly of the blade 114. The blade 114 is in turn positioned radially outwardly of the peripheral guide bar 118. With further rotation of the rotary member 20, the dull edge on the forward portion of the blade 113 follows the contour of the mating surface on the two parts of the hock joint. That is, the blade 113 is contoured such that its contacting edge moves closer to the axis of symmetry of the rotary member 20. The sharp edge on the trailing portion of the blade 113 then contacts the connective tissue between the two parts of the hock joint, severing or almost severing both that tissue and tendons on the underside of the hock joint. The support bar 116 supports the lower part of the legs during such cutting (see FIG. 9) to prevent the tendons on the underside of the hock joint from moving downwardly with the edge of the blade. Any tendons or other connective tissue remaining unsevered after moving past the blade 113 impinge on and ride up on the sharp front inclined edge of the blade 115, the tendons or other tissue being thereby severed. The severed lower part of the legs are retained on the shackle 48, and the remainder of the carcass is retained on the carriage 60 by the capture of the hock joints between the support rest 63 and the peripheral guide bar 117.

Immediately after the carriage 60 moves past the end of the knife mechanism 112, the carriage 60 resumes its inclined position when the annular wheel 73 returns to the upper portion of the ring-like surface 74. Coinciding with such change in orientation of the carriage 60, the peripheral guide bar 117 assumes a new path, downward and radially outward of its former path, as illustrated in FIG. 3. As shown in FIG. 11, the support bar 116 has meanwhile terminated and the guide bar 130 has commenced. The guide bar 130 assists in supporting the carcass on the carriage 60. The shackle 48 holding the lower part of the legs of the carcass moves off across the peripheral guide bar 117 and around the small rotary member B. The shackle 48 will subsequently be emptied of its contents and reloaded with fresh poultry.

The carriage 60 with the retained carcass thereon moves in the inclined position on the rotary member 20 to a position adjacent to the small rotary member C. As shown in FIG. 4, empty evisceration shackles 54 are moving clockwise onthe second conveyor line, the position of each of those shackles being synchronized with the position of a respective one of the carriages 60. Each shackle 54 is stabilized in its rotation around the small rotary meber C by its capture between the outer guide bar 127, the inner guide bar 128, and a respective adjacent pair of spacers 126 on the second disc 122.

As the shackle 54 that is associated with the carriage 60 of interest becomes adjacent to the drum 32 of the rotary member 20, the lower end of the shackle abuts against the respective carriage 60 at that position on the rotary member 20 and against the upper part of the carcass on that carriage. The outer guide bar 127 has at this point terminated, and the shackle 54 is retained between the carriage 60 and the inner guide bar 128. Lateral movement of the shackle 54 is prevented by the stem of the shackle 54 moving into the groove of a respective one of the spacers 110 held by the rings 33 and 34 on the drum 32.

As shown in FIG. 4, the termination of the peripheral guide bar 117 frees the carcass from its retention on the support rest 63 of the carriage 60. Simultaneously, the cam members 69 on the carriage 60 move into abutment with the biased arm 131. That action pushes the push rods 68 outwardly through the plate 64 such that the enlarged ends on the push rods 64 abut against the carcas to push it radially outwardly from the rotary member 20, as shown in FIGS. 12 and 13. The effect of the various foregoing actions on the carcass is to route it such tha its hock joints fall into the jaws of the associated shackle 54 moving with the carriage 60. The shackle 54 has its lower ends vertically positioned such that the joints of the carcass enter between the wide spacing at the top of the inner and outer legs of the shackle jaws. Those joints then drop between those inner and outer legs of the shackle to be retained at the lower end therof.

The inner guide bar 128 and the guide bar 130 then terminate, and the shackle 54 moves off around the small rotary member D. At that point, the carcass is retained on the shackle 54 by gravity for subsequent evisceration and other procedures. The small rotary member D is similar to the small rotary member A in that it has four co-planar discs adapted to stabilize the shackle 54 and attached carcass as they move at high speed therearound. As with the other three small rotary members, the small rotary member D also has a pair of guide bars extending around its periphery to prevent radially-outward motion of the shackle and its contents as they move therearound.

The preferred embodiment which has just been described has reference to the carcasses of New York dressing chickens which weigh between two and six pounds including their viscera, lower legs, and head, but not including their feathers and blood. As earlier mentioned, the preferred embodiment utilizes a drum 32 that is 35.3 inches in nominal diameter. The motor utilized for powering the apparatus develops 5 horsepower, which is sufficient to drive the rotary member 20 and the connected first and second conveyor lines— each of which could be hundreds of feet long. The shackles are mounted on those lines at 6 inch intervals. The capacity of the equipment described in the preferred embodiment is approximately 7500 birds per hour.

It should be appreciated that the subject invention is not restricted to the preferred embodiment, but encompasses all embodiment that substantively take the inventive concept.

We claim:

1. An apparatus for transferring poultry carcasses hung by their legs from the shackles on one conveyor line to the shackles on a second conveyor line, the apparatus comprising:
    (a) a generally circular rotary member having on its periphery at equiangularly spaced positions a series of holding elements, one portion of the path of the first and second conveyor lines extending adjacent to respective first and second portions of the path of the periphery of the rotary member, the rotation of the rotary member and movement of the shackles on the two conveyor lines being synchronized such that the movement of the shackles adjacent to the periphery of the rotary member is at the same speed as that periphery;
    (b) retention means associated with the holding elements for retaining on each holding element a poultry carcass held by a shackle on the one conveyor line as that shackle moves adjacent to the periphery of the rotary member, the retention means retaining the poultry carcass on the holding element until the rotary member has rotated such that the holding element is adjacent to a shackle on the second conveyor line, the poultry carcass then dropping under gravity from the holding element onto the shackle on the second conveyor line to be hung by its legs from that shackle; and (c) release means for releasing the hold of the shackle on the one conveyor line on the poultry carcass after that carcass becomes retained on the one of the holding elements, the release means severing that portion of the legs of the poultry carcass holding the carcass on the shackle on the one conveyor line from the remainder of the carcass.

2. An apparatus as in claim 1, wherein the retention means is at least one stationary guide bar extending adjacent to the path of the periphery of the rotary member, the at least one guide bar acting on each carcass to hold that carcass between the at least one guide bar and the respective holding element.

3. An apparatus as in claim 1, wherein the release means is a stationary elongated knife mechanism extending adjacent to the path of the periphery of the rotary member, the knife mechanism being positioned such that (it) an edge of the knife mechanism contacts the legs of the carcass between that position on the legs of the carcass at which the carcass is held on the shackle on the one conveyor line and that position on the carcass at which the carcass is retained by the retention means, the knife mechanism being oriented such that at least a portion of (its contacting) the edge of the knife mechanism increases the depth of its displacement into the legs of the carcass as the carcass is rotated on the rotary member.

4. An apparatus as in claim 3, wherein the contacting edge of the knife mechanism has:

(a) a first sharp portion which initially contacts the carcass to sever a first portion of the connective tissue extending between two parts of a leg joint;

(b) a dull portion which extends between the two parts of the leg joint to increase the separation between those parts; and (c) a second sharp portion which severs a second portion of the connective tissue extending between the two parts of the leg joint.

5. An apparatus as in claim 4, wherein the knife mechanism has a first blade and a parallel shorter second blade, the first and second blades being oriented so as to initially contact the carcass together, and wherein the second blade has the first sharp portion of the contacting edge of the knife mechanism and the first blade has the dull portion of that contacting edge.

6. An apparatus as in claim 5, wherein the first blade also has the second sharp portion of the contacting edge of the knife mechanism, the second sharp portion being on the trailing edge of the first blade.

7. An apparatus as in claim 5, wherein the knife mechanism has a third blade oriented so as to extend in-line with, and behind, the trailing edge of the first blade, and wherein the second sharp portion of the contacting edge of the knife mechanism is partially on the trailing edge of the first blade and partially on the third blade.

8. An apparatus as in claim 7, wherein that part of the second sharp portion of the contacting edge that is on the third blade faces at an inclination the trailing edge of the first blade such that any remnant of the second portion of the connective tissue remaining unsevered after movement across the first and second blades moves against and rides up on the inclined sharp edge of the third blade and is thereby severed.

9. An apparatus as in claim 8, wherein the second blade of the knife mechanism is positioned radially inward on the rotary member from the first blade.

10. An apparatus as in any one of claims 5, 6 or 7, wherein the joint is the hock joint separating the upper part of the leg from the lower part of the leg, wherein the lower part of the leg is held on the shackle on the one conveyor line and the upper part of the leg is retained with the remainder of the carcass by the retention means, and wherein the position of the edge of the first blade that extends between the two parts of the hock joint varies radially along the length of the blade such that that edge generally follows the mating surface on the part of the hock joint on the upper part of the leg.

11. An apparatus as in claim 3, wherein each of the holding elements is pivotally connected to the rotary member, the pivot axis of each holding element extending generally tangentially on the rotary member and normal to the symmetry axis of the member, and wherein the holding elements each assume alternate angular inclinations relative to the rotary member, the one angular inclination being normally assumed by each holding element and the other angular inclination being assumed by each holding element during its movement past the elongated knife mechanism.

12. An apparatus as in claim 11, wherein each holding element comprises a face generally configured to the body contour of a poultry carcass, that face extending generally vertically when the holding element assumes the other angular inclination and that face inclining downwardly, inwardly when the holding element assumes the one angular inclination, and wherein the upper edge of that face is configured such that the upper part of each leg is adapted to be recessed therein with the hock joint being proximate of that upper edge.

13. An apparatus as in claim 12, wherein each poultry carcass is held on the shackle on the one conveyor line by the outer end of the lower part of each of its legs, and wherein when that carcass becomes adjacent to the periphery of the rotary member the body of the carcass moves into abutment with the face of the holding element, the holding element having at that position the one angular inclination, the shackle and the attached lower part of the legs being positioned radially inwardly on the rotary member from the upper edge of the face of the holding element at that position, the shackle being biased radially inwardly on the rotary member such that the lower part of each of the legs is placed in tension.

14. An apparatus as in claim 11, wherein the elongated knife mechanism is positioned radially inwardly from, but proximate of the path of the upper edge of the face of the holding element, the knife mechanism being adapted to contact the hock joints of the carcass positioned proximate of that upper edge.

15. An apparatus as in claim 14, wherein the retention means comprises a stationary guide bar extending adjacent to the path of the periphery of the rotary member and in spaced relation to the upper edge of the face of the holding element, the guide bar being adapted to act against the upper part of each leg when that leg is recessed in the upper edge of that face.

16. An apparatus as in claim 15, and further comprising a second stationary guide bar extending adjacent to the path of the periphery of the rotary member and in spaced relation to a lower edge of the holding element, the second guide bar being adapted to provide support to assist in retaining the carcass on the holding member.

17. An apparatus for transferring a poultry carcass held by the lower part of its legs on a first shackle on one conveyor line to a second shackle on another conveyor line, the apparatus comprising:

(a) a generally circular carousel adapted to be rotated at a selected speed and having on its periphery a series of equiangularly-positioned holding members each generally configured to the back profile of a downwardly-extending poultry carcass, the one conveyor line having a portion of its path extending proximate of one portion of the path of the periphery of the carousel and the other conveyor line having a portion of its path extending proximate of another portion of the path of the periphery of the carousel, shackles on the two conveyor lines being adapted to move at synchronous speed with the periphery of the carousel;

(b) an elongated stationary guide bar extending adjacent to the path of the periphery of the carousel between the one and the other portions of that path, the guide bar acting to press the upper part of the legs against a corresponding one of the holding members, the lower part of the legs being simultaneously held by the first shackle so as to extend radially inwardly on the rotary member; and, (c) an elongated stationary knife mechanism extending adjacent to the one portion of the path of the periphery of the carousel, the knife mechanism having a radial position on the carousel corresponding to the position of each of the joints between the upper and lower parts of the leg, the holding member being adapted to support the pair of joints against downward movement, the edge of the knife mechanism being sloped so as to increase its penetration into joints contacted during rotation of the carousel, the knife mechanism being contoured such that its contacting edge generally follows the mating surface on that part of the joint on the upper leg, the knife mechanism having a first sharp portion for severing a first portion of the connective tissue connecting the two parts of the joint, the knife mechanism having a dull portion adapted to extend between the two parts of the joint to increase their separation, and the knife mechanism having a second sharp portion for severing a second portion of the connective tissue connecting the two parts of the joint;

whereby, the upper part of the legs of a carcass held on the first shackle by the lower part of its legs are retained between a corresponding one of the holding members and the guide bar, the lower part of the legs are then severed from the remainder of the carcass, the carousel then retains that remainder until the guide bar moves out of adjacency with the holding member, and that remainder then drops by gravity onto the second shackle.

18. An apparatus as in claim 17, wherein a bias is applied to the first shackle on the one conveyor line in the one portion of the periphery of the carousel to move the portion of that shackle holding the carcass radially inwardly on the carousel relative to the corresponding holding member, that bias being applied by a tensioned endless belt acting against the shackle.

19. An apparatus as in claim 1, wherein the rotary member is rotatably driven at a selected speed by a motor means and wherein the one conveyor line and the second conveyor line are driven through gear means connected to the rotary member.

20. An apparatus as in claim 17, wherein the carousel is rotatably driven by a motor means and the one conveyor line and the other conveyor line are driven through a mechanical linkage connecting them to the carousel.

21. An apparatus for transferring poultry carcasses as in claim 1, wherein the first and second conveyor lines each have a generally rectangular configuration, and the one portion of the first and second conveyor lines are each one of the smaller ends of the respective rectangular configuration, the conveyor line corners adjacent to the rotary member being rounded.

22. An apparatus for transferring poultry carcasses as in claim 21, and also comprising a shackle guide means at each of the rounded corners, each of the shackle guide means comprising:

(a) a rotatable shaft pivotally secured to the frame of the apparatus such that its axis of rotation is parallel to that of the generally circular rotary member; and, (b) a series of discs symmetrically secured to the rotatable shaft such that a portion of the path of the periphery of each disc is adjacent to the portion of the respective first or second conveyor line at the respective rounded corner; whereby each shaft rotates such that the perihery of each of the discs secured thereto has a speed corresponding to that of the shackles moving on the respective first or second conveyor lines.

23. An apparatus for transferring poultry carcasses as in claim 22, wherein at least one of the discs secured to each rotatable shaft has a series of brackets extending around its periphery spaced such that the stem of a shackle moving on the respective first or second conveyor lines adjacent to that periphery extends between an adjacent pair of brackets, and wherein each of the shackle guide means also comprises a pair of arcuate guide bars secured to the frame of the apparatus to extend along that portion of the path of the periphery of the at least one of the discs that is adjacent to the portion of the respective first or second conveyor line at the respective rounded corner, one of the arcuate guide bars being positioned radially outward of the path of a shackle moving on the respective first or second conveyor line and the other arcuate guide bar being positioned radially inward of the path of that shackle, whereby a shackle moving around the rounded corner of a respective one of the first or second conveyor lines is restrained radially during such movement by the pair of arcuate guide bars and is restrained angularly during such movement by an adjacent pair of brackets on the periphery of the at least one of the discs.

24. An apparatus for transferring poultry carcasses as in claim 23, wherein the arcuate guide bar that is positioned radially inward on the shackle guide means positioned on the upstream side of the second conveyor line extends along at least a part of the second portion of the path of the periphery of the rotary member, and wherein each of the holding elements has a projecting nose adapted to engage with a respective one of the shackles on the second conveyor line during movement of that shackle along the second portion of the path of the periphery of the rotary member, whereby the arcuate guide bar retains the shackle on the nose of the respective holding element while a poultry carcass on the respective holding element drops under gravity into the shackle.

25. An apparatus for transferring poultry carcasses as in claim 24, wherein each of the holding elements has a push rod means slidably connected thereto to move generally radially on the apparatus, each push rod means being actuated to slide generally radially outward by contact with an arm pivotally secured to the frame of the apparatus in a biased position, such actuation occurring after movement of the respective holding element past the terminal end of the retention means, the push rod means pushing the poultry carcass away from the respective holding element during such actuation.

26. A method for transferring a poultry carcass held by the lower part of its legs on a shackle on a first conveyor line to a shackle on a second conveyor line, the method comprising:

(a) moving the carcass on the one conveyor line until the carcass abuts against a corresponding holding element on the periphery of a rotary member positioned between the first and second conveyor lines, the shackle on the first conveyor line during such movement maintaining its hold on the lower part of the legs of the carcass, the first and second conveyor lines being configured such that each of their paths extend adjacent to a respective different portion of the path of the periphery of the rotary member;

(b) rotating the rotary member with the carcass abutting against the corresponding holding element on the periphery of the rotary member, such rotation bringing the holding element adjacent to a stationary retention means, the retention means acting to retain the carcass on the holding element, the retention means extending adjacent to the path of the periphery of the rotary member between the portion of that path adjacent to the first conveyor line and the portion of that path adjacent to the second conveyor line;

(c) severing the lower part of the legs of the carcass from the remainder of the carcass in the portion of the path of the periphery of the rotary member adjacent to the first conveyor line, the lower part of the legs being severed by means of a knife mechanism extending adjacent to and along that portion of the path, the knife mechanism being positioned relative to the rotary member between the path of the shackle on the first conveyor line and the path of the corresponding holding element; and (d) dropping the remainder of the carcass from the rotary member onto the shackle on the second conveyor line in the portion of the path of the periphery of the rotary member adjacent to the second conveyor line, the retention means terminating its adjacency to that path immediately prior to the position at which the carcass is dropped.

* * * * *